Aug. 26, 1941.   J. H. SPEED   2,253,990
TOOL HANDLE
Filed March 23, 1940
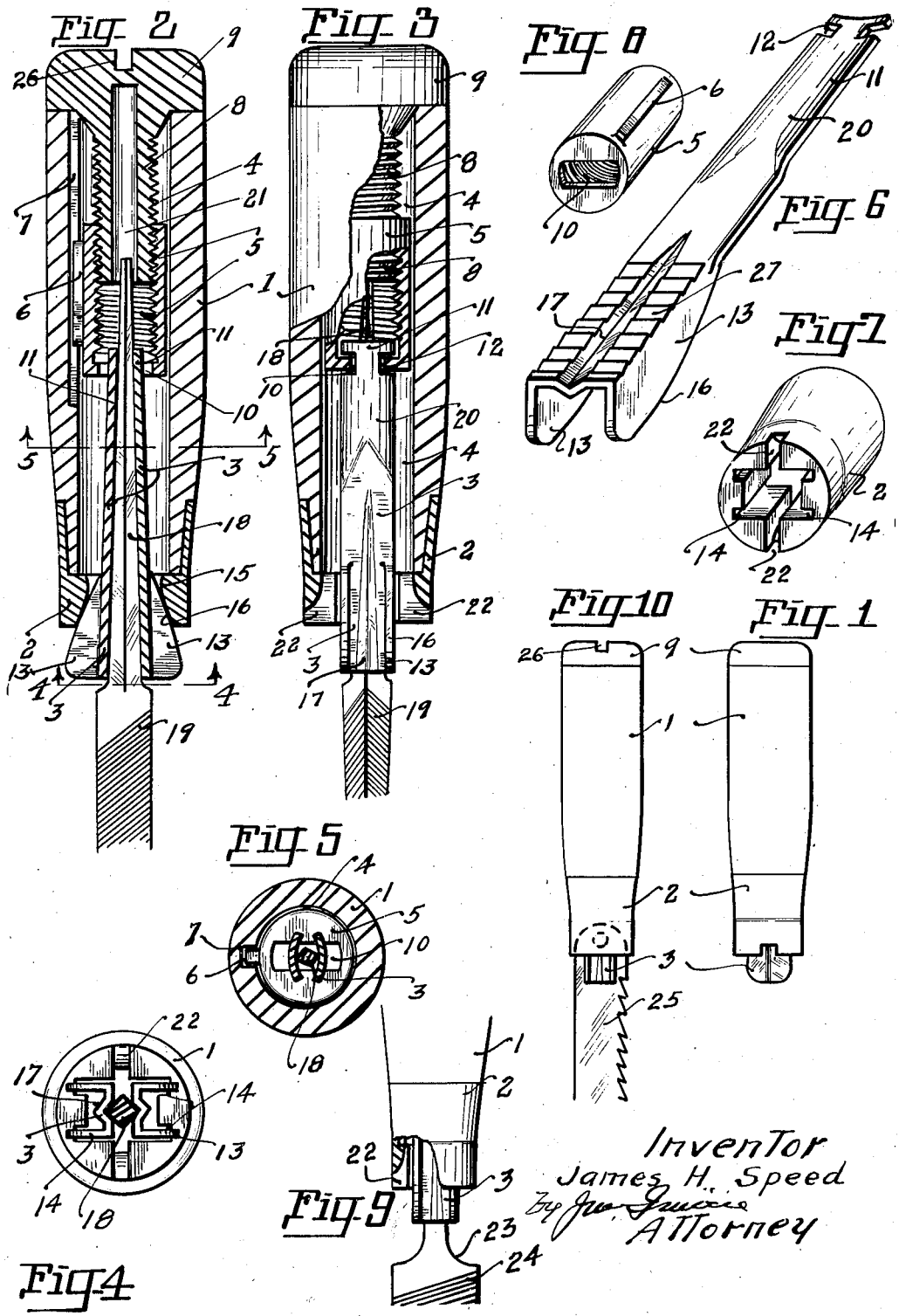
Inventor
James H. Speed
Attorney Patented Aug. 26, 1941

2,253,990

UNITED STATES PATENT OFFICE 2,253,990

TOOL HANDLE

James H. Speed, Portland, Oreg., assignor to Robert H. Bigham, Portland, Oreg.

Application March 23, 1940, Serial No. 325,631

1 Claim. (Cl. 279—39)

This invention relates to tool handles, and is particularly adapted for holding files, screwdrivers, small drills, chisels, hacksaws and the like.

The primary object of the invention is to provide a handle for files and the like that can be easily applied, and that will grip the shank of the tool securely.

Another object of the invention is to provide a tightening mechanism, in the form of jaws, that will securely grip the shank of the tool throughout the entire length of the shank of the tool.

And another object of the invention is to provide tightening mechanism for clamping the jaws that will permit the shank of the tool to pass centrally through the jaw operated mechanism.

A further object of the invention is to provide a tool handle that can be easily applied to the tools without requiring wrenches and so forth.

These and other incidental objects will be apparent in the drawing, specification and claim.

Referring to the drawing:

Figure 1 is a side elevation of the tool holder.

Figure 2 is a sectional elevation of the tool holder, having the shank of the tool clamped therein.

Figure 3 is a side sectional view, at right angles to Figure 2, parts broken away for convenience of illustration.

Figure 4 is an end view, taken on line 4—4 of Figure 2.

Figure 5 is a sectional view, taken on line 5—5 of Figure 2.

Figure 6 is a perspective view of one of the clamping jaws removed from the handle.

Figure 7 is a perspective view of the ferrule of the handle, which also provides the guide for holding the outer end of the clamping jaws.

Figure 8 is an end perspective view of the jaw adjusting and holding sleeve.

Figure 9 is a fragmentary view, illustrating a flat file being placed within the handle, part way before clamping in place.

Figure 10 is a side view of the handle holding an ordinary hack-saw blade.

In the drawing:

The handle is indicated at 1, having a ferrule 2 at its lower end for guiding and holding the clamping jaws 3. The handle 1 is formed with a hollow core 4. Within the core 4 a threaded sleeve 5 which works freely longitudinal of the handle, this sleeve is prevented from turning within the core 4 by the key 6 working within the key-way 7 of the handle 1. The position of the sleeve 5 is determined by the adjusting screw 8 which terminates in the adjusting knob 9.

A slot 10 is provided within the lower end of the sleeve 5 for receiving the upper ends 11 of the jaws 3. The ends 11 of the jaws are notched at 12. As the jaws 3 are wider than the slot 10 of the sleeve 5, the notches 12 will hold the jaws within the slot when inserted and given a quarter turn. Cams 13 are formed integral with the jaws 3 and work within the slots 14 of the lower ferrule 2 of the handle 1. The bottoms of the slots 14 are inclined as shown at 15, and cooperate with the cam surface 16 of the cams 13 for controlling the width of the opening of the jaws 3. The jaws may have a V-shaped guide for guiding the shank 18 of the tool 19. The upper ends 11 of the jaws are also curved as shown at 20 for assisting in holding the shank of the tool 18 in alignment.

In operation the shank 18 of the tool is inserted between the jaws 3, said jaws first being forced downward and out of the ferrule 2 by the adjusting knob 9 being rotated so as to cause the adjusting screw 8 to force the sleeve 5 towards the ferrule 2, thereby forcing 3 downward and out of the end of the ferrule 2, the cam surfaces 16 will permit the jaws to open as the jaws are forced outward from the handle, the shank of the tool having been put in place between the jaws, best shown in Figure 2. The adjusting knob 9 may be rotated so as to raise the sleeve 5 or pull it away from the ferrule 2, pulling the jaws 3 into the handle causing the cam surfaces 16 to cooperate with the inclined bottoms 15 of the slots 14 forcing the jaws together and gripping the shank 18 of the tool 19 securely. The adjusting screw 8 has a hollow core 21 for receiving the shanks of the tools being clamped within the handle. This is an important feature.

Slots 22 are provided within the ferrule 2 for receiving the lower part 23 of the shanks of some tools, such as the flat file 24 or the hack-saw blade 25, providing additional rigidity to the tool handle. A slot 26 may be provided within the adjusting knob 9 for receiving a tool for assisting in the clamping of the handle. The inner surfaces of the jaws 3 may be roughened, as shown at 27, for assisting in the gripping of special tools between the jaws.

I do not wish to be limited to this particular mechanical construction, as modified applications of mechanics may be employed, still coming within the scope of the claim to follow.

I claim:

A tool handle including a handle proper, a ferrule at one end of the handle, an operating member rotatably and longitudinally movable in the opposite end of the ferrule, gripping jaws movable in the ferrule and handle presenting relatively flat adjacent gripping faces, the flat face of each jaw having at the respective longitudinal edges right angled outwardly extending parallel cam projections, the ferrule being formed at each side of the jaw receiving opening with spaced parallel cam slots to receive and accurately cooperate with the pair of cam projections on each jaw and move the faces of the jaws toward each other in the relatively inward movement of the jaws, and an element intermediate the operating member and the upper ends of the jaws and responsive to rotation of the operating member to move longitudinally within the handle, the element being formed at the end remote from the operating member with a slot to receive a reduced portion at the upper end of each jaw, the slot being of a width corresponding to that of the reduced portion of the jaws and of a length slightly exceeding the full width of the upper ends of the jaws, whereby to permit limited free movement of the jaws relative to the inner diameter of the element to compensate for different thickness of that portion of an introduced tool between the jaws, and thereby facilitate gripping action throughout the full length of the jaws, and cooperating means on the handle and element to prevent rotative movement of the element.

JAMES H. SPEED.